(12) United States Patent
Atherton

(10) Patent No.: US 6,466,194 B1
(45) Date of Patent: Oct. 15, 2002

(54) SELF SCANNED INTEGRATED DISPLAY HAVING REDUCED STRESS COLUMN DRIVERS

(75) Inventor: James Harold Atherton, Ringoes, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/474,293

(22) Filed: Dec. 29, 1999

Related U.S. Application Data

(62) Division of application No. 09/201,033, filed on Nov. 30, 1998.
(60) Provisional application No. 60/096,797, filed on Aug. 17, 1998.

(51) Int. Cl.$^7$ .............................. G09G 3/36; G09G 5/00
(52) U.S. Cl. ....................................... 345/100; 345/204
(58) Field of Search .............................. 345/90–93, 98, 345/100, 104, 204

(56) References Cited

U.S. PATENT DOCUMENTS

| | | | |
|---|---|---|---|
| 4,412,139 A | * 10/1983 | Horninger .................... 326/87 |
| 5,170,155 A | 12/1992 | Plus et al. | |
| 5,266,930 A | 11/1993 | Saitoh | |
| 5,317,401 A | 5/1994 | Dupont et al. | |
| 5,426,447 A | 6/1995 | Lee | |
| 5,555,001 A | 9/1996 | Lee et al. | |
| 5,670,979 A | 9/1997 | Huq et al. | |
| 5,673,063 A | 9/1997 | Weisbrod | |
| 5,686,935 A | 11/1997 | Weisbrod | |
| 5,701,136 A | 12/1997 | Huq et al. | |
| 5,726,678 A | * 3/1998 | Dingwall ..................... 345/100 |
| 5,748,175 A | * 5/1998 | Shimada et al. ............ 345/660 |
| 6,046,736 A | * 4/2000 | Atherton ..................... 345/100 |
| 6,232,945 B1 | * 5/2001 | Moriyama et al. ............ 345/98 |

* cited by examiner

Primary Examiner—Bipin Shalwala
Assistant Examiner—David L. Lewis
(74) Attorney, Agent, or Firm—William J. Burke

(57) ABSTRACT

A display device includes a column driver having an initialization sequence in the vertical blanking interval. The signal used to render the column driver TFT conductive is determined in the vertical blanking interval and maintained on a capacitor in the column driver for the duration of the vertical field. The column driver also includes an autozero comparator which is subject to the autozero operation during the vertical blanking interval.

9 Claims, 3 Drawing Sheets

SELF SCANNED INTEGRATED DISPLAY HAVING REDUCED STRESS COLUMN DRIVERS

This application claims the benefit of U.S. Provisional Application No. 60/096,797 filed Aug. 17, 1998. This application is a divisional application of U.S. patent application Ser. No. 09/201,033 filed Nov. 30, 1998.

FIELD OF THE INVENTION

The present invention is directed to self scanned integrated displays and in particular to displays having a column driver which exhibits reduced voltage stress.

BACKGROUND OF THE INVENTION

Active matrix liquid crystal displays generate images by altering the polarization of individual picture elements using a liquid crystal material. The picture elements (pixels) are arranged in rows and columns. Image data is loaded into the liquid crystal display one row at a time. The rows of pixels are sequentially scanned in order to form image frames.

Each pixel in an active matrix display includes a thin film transistor (TFT). The thin film transistor receives video data from a column driver on the display when the display row containing the pixel is selected. The TFT stores the received video data onto the capacitance of the pixel.

One material which may be used to form active matrix LCD displays is amorphous silicon. This material has the advantage that it may be fabricated at relatively low temperatures.

Because the TFTs of the pixels are fabricated from amorphous silicon. It is desirable to implement the peripheral circuitry, for example, the line scanners and column drivers using TFTs. It is difficult to design circuitry with TFTs, however, because they exhibit threshold drift. Threshold drift is a phenomenon where the gate to source voltage needed to turn on the transistor changes over time. In amorphous silicon TFTs, threshold drift occurs when a TFT is driven at a high duty cycle.

U.S. Pat. No. 5,670,979 to Huq et al. entitled "Dataline Drivers with Common Reference Ramp Display" discloses a column driver implemented with amorphous silicon technology. The column driver disclosed in this patent includes circuitry which adjusts the drive voltage of certain ones of the transistors to accommodate for threshold drift in these transistors. The disclosed circuit, however, drives transistors at a relatively high duty cycle, and thus undesirably reduces the expected lifetime of these transistors.

SUMMARY OF THE INVENTION

The present invention is embodied in a display device which includes a column driver having an initialization sequence in the vertical blanking interval.

According to one aspect of the invention, the display device is an active matrix display including a thin-film transistor (TFT) which is connected to drive the column of the display device. The signal used to render the column driver TFT conductive is determined in the vertical blanking interval and maintained on a capacitor in the column driver for the length of the vertical field internal.

According to another aspect of the invention, the autozero operation on the comparator of the column driver is performed during the vertical blanking interval.

DETAILED DESCRIPTION

An XGA display includes 1,024 column drivers, each of which drives 768 pixels. Because the entire XGA display is updated every 16.7 MS, the total line time is approximately 16 microseconds. In this time, potential values stored in the capacitance of each LCD cell of the line are dissipated and new potentials are established. Due to the relatively short amount of time to perform these operations, it is advantageous for the data ramp signal to be active for the longest amount of time possible during the 16 microseconds. According to one aspect of the present invention, the initialization of the column driver circuitry (not shown) of the display device (not shown) is modified so that it occurs during the vertical blanking interval rather than during the horizontal line interval.

Figure 1:
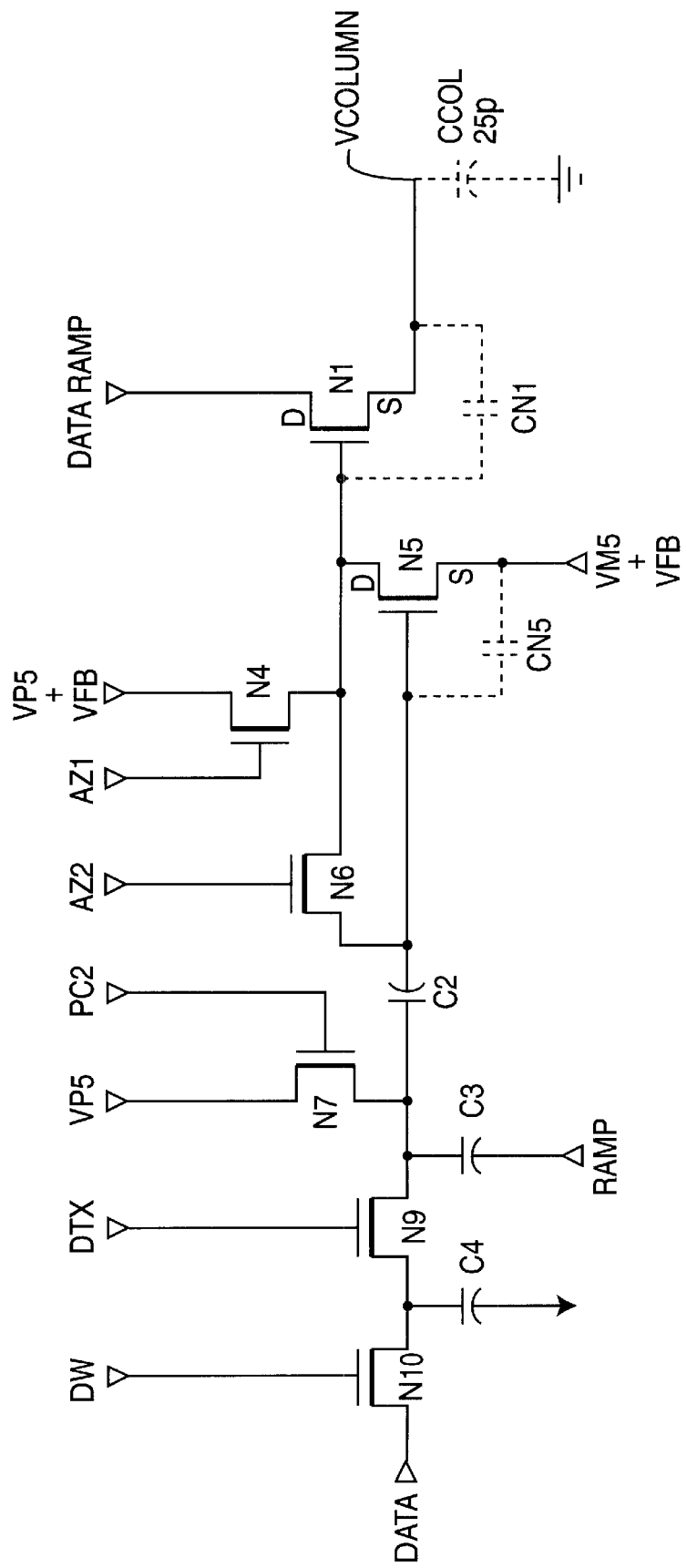
FIG. 1 is a schematic diagram of a conventional column driver.

FIG. 1 is a schematic diagram of a prior art column driver circuit similar to that described in the above referenced patent to Huq et al. The column drivers shown in FIGS. 1 and 2 include features which are not illustrated in the drawing figures. In particular, data signals are loaded into the column drivers in a two step pipeline. During the time at which the column driver is transferring a pixel of line N to the display device for display, the corresponding pixel data for line N+1 is being loaded into the column driver and particularly on to capacitor C4. After line N has been loaded into the pixels of the LCD display, the data for line N+1 in each of the column drivers is transferred from capacitor C4 to capacitor C3 responsive to the signal DTX. The description of the column driver set forth below does not address the transfer of data from column storage elements into the column drivers via the transistor N10 and data write pulse, DW. Instead this description begins at the start of the horizontal line period in which the data to be loaded into the array has previously been stored onto the capacitor C4.

Figure 2:
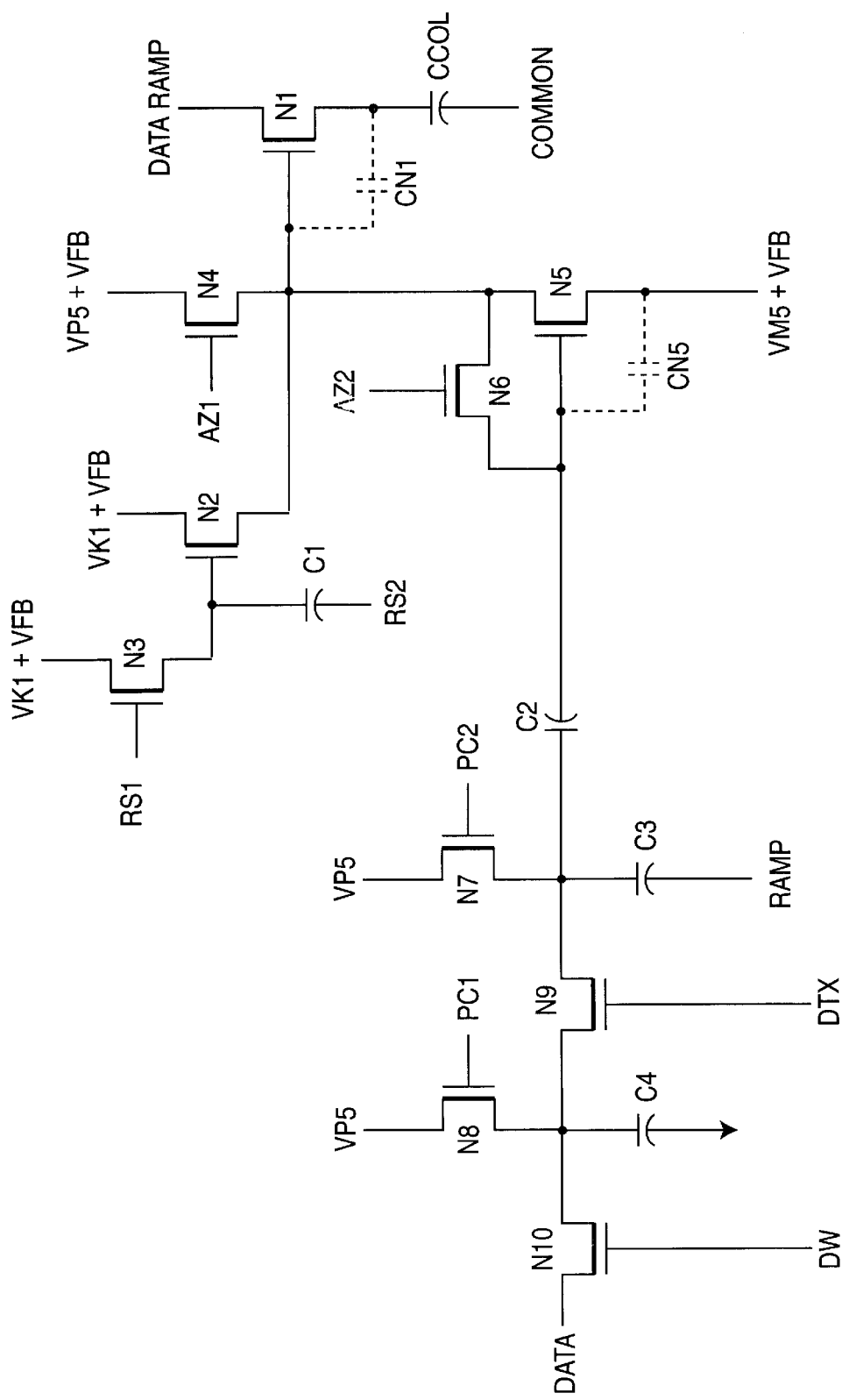
FIG. 2 is a schematic diagram of a column driver circuit according to the present invention.

The column drivers shown in FIGS. 1 and 2 also include a feature by which gate voltages applied to certain of the TFT's are adjusted to compensate for threshold drift. The compensating signal is indicated in FIGS. 1 and 2 as VFB. This signal may be developed, for example, by subjecting a dummy TFT (not shown) to the current and driving potentials of, for example, the transistor N1. The response of the dummy transistor may be monitored by feedback circuitry (not shown) to determine the driving voltage needed by the dummy transistor to produce the desired output current. The feedback circuit adjusts the driving voltage by an amount, VFB, to compensate for drift in the threshold voltage of the TFT. This adjustment potential is then applied to other TFT's in the display device which may be subject to threshold drift.

FIG. 1 is described with reference to the timing diagram shown in FIG. 3. The column driver shown in FIG. 1 is inactive between time T0 and time T1, the row deselect interval. At time T1, signal AZ1 becomes logic high, turning on transistor N4 and applying a voltage VP5 (e.g. +5 volts)+VFB to the gate electrode of transistor N1. This pulse of the signal AZ1 establishes a potential of VP5+VFB across capacitor CN1 which represents the gate to source capacitance of the transistor N1. Next, at time T2, the signal AZ1 becomes logic low and the signal AZ2 becomes logic high.

Signal AZ2 turns on transistor N6 which connects the drain electrode of transistor N5 to its gate electrode. Due to the potential stored on capacitor CN1, this pulse of the signal AZ2 turns on transistor N5 allowing the potential stored on capacitor CN1 to drain to the supply voltage level VM5 (e.g. −5 volts)+VFB. When the charge across capacitor CN1 dissipates to just below the potential needed to turn on transistor N5, transistor N5 is rendered non-conductive.

This operation of pulse AZ2 autozeros the comparator, represented by transistor N5, by establishing a potential across capacitor CN5 (the gate to source capacitance of transistor N5) which is substantially equal to the gate to source threshold potential of transistor N5. This operation removes this threshold potential from the comparison operation performed by the transistor N5 when data values are written into the pixels of the display device.

Also between times T2 and T3, the signal PC2 becomes logic high connecting capacitor C3 to the potential VP5 through transistor N7. This pulse initializes capacitor C3 at the largest possible pixel potential. This operation conditions the capacitor C3 to accept the data value stored on capacitor C4. Signals AZ2 and PC2 are activated at the same time in order to remove any charge from capacitor C2, the coupling capacitor between capacitor C3 and the gate electrode of transistor N5, while capacitor C3 is charged to the VP5 potential. At time T3, both the signals AZ1 and DTX become logic high. The signal DTX connects capacitor C4 to capacitor C3, causing the potential stored on capacitor C3 to be reduced in proportion by the pixel data potential stored on capacitor C4. Thus, at time T4, when signal DTX becomes logic low, the difference between the potential VP5 and the potential stored on capacitor C3 is proportional to the data value which had previously been stored on capacitor C4.

At time T3, when signal AZ1 again becomes logic high, the gate electrode of transistor N1 is charged to the VP5+VFB potential, which turns on the transistor N1. At time T3, the value of the data ramp signal is at a reference potential (e.g. ground) and any charge which had been stored on the capacitance of the selected pixel is dissipated through transistor N1.

At time T5, the charge on the pixel capacitance has been dissipated and signal AZ1 becomes logic low. Next, at time T6, both of the signals RAMP and DATA RAMP begin to increase. Due to the potential stored across capacitor CN1 between times T3 and T5 responsive to the signal AZ1, transistor N1 remains conductive as the data ramp signal is applied to the pixel capacitance. The signal RAMP is added to the potential stored on capacitor C3 and the sum of these potentials is applied to the coupling capacitor C2.

The sum of the signal RAMP, the potential across capacitor C3 and the potential across capacitor C2 represents a potential which is applied to the gate electrode of transistor N5. As this potential rises above the threshold potential of transistor N5, the transistor is turned on, dissipating the charge stored at the gate electrode of transistor N1. As this charge dissipates, transistor N1 is turned off. The potential stored on the pixel capacitance is held at the value of the signal DATA RAMP when transistor N1 is turned off.

The prior art column driver initializes the potential across capacitors CN1 and CN5 during each line interval. Thus, transistors N4 and N6 are subject to a duty cycle which includes one pulse per line of the image.

To improve the expected life times of transistors N4 and N6 it is desirable to reduce their duty cycle. In addition, it would be advantageous for the operation of the column driver, especially for a high resolution display device, if the portion of the line time used to store image data into the pixel cells 122 could be increased.

FIG. 2 is a schematic diagram of a column driver according to the present invention which achieves these goals. FIG. 2 is described with reference to the timing diagram shown in FIG. 4.

The circuitry shown in FIG. 2 has been modified relative to the circuitry shown in FIG. 1 to activate transistor N4 only during the vertical blanking interval. In addition, transistors N2 and N3 and capacitor C1 have been added to apply the potential which turns on transistor N1 prior to the start of the comparison operation. The gate voltage applied to transistor N2 has been compensated via the feedback voltage VFB to track any threshold drift of transistor N2.

Figure 3:
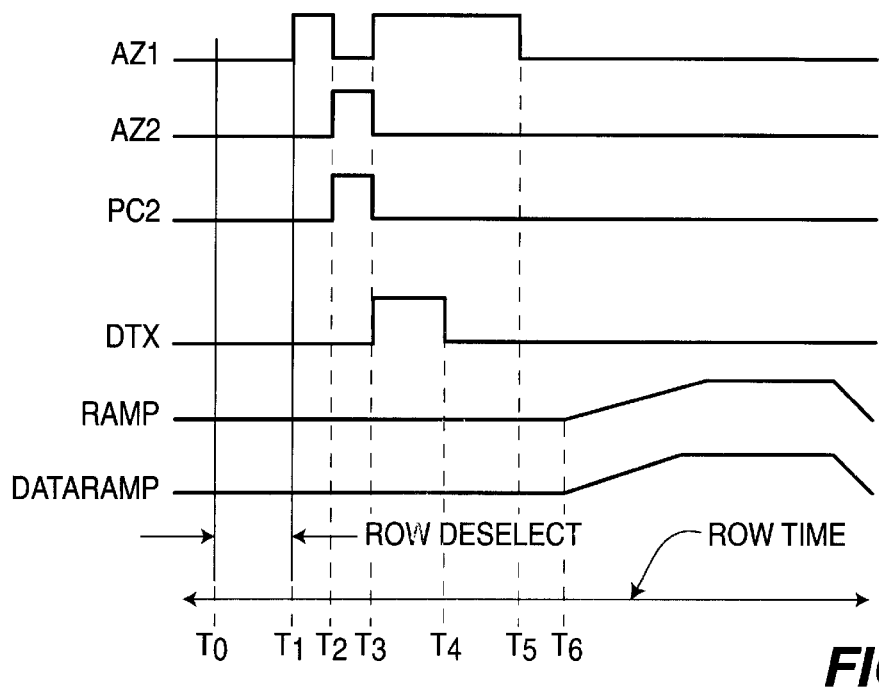
FIG. 3 is a timing diagram which is useful for describing the operation of the column driver shown in FIG. 1.

With reference to FIG. 3, the circuitry shown in FIG. 2 operates as follows. During the vertical blanking interval, at time T8, signal RS1 becomes logic high and RS2 transitions from a logic-low voltage, $V_0$, to a voltage $V_1$ which is less than the logic-high voltage, $V_2$. Signal RS1 gates the potential VK1 (e.g. 18 volts)+VFB onto the capacitor C1 while signal RS2 holds the lower plate of the capacitor at $V_1$ potential. The potential VK1+VFB is sufficient to turn on transistor N2. Applying the potential VK1+VFB onto the gate electrode of transistor N1.

At time T9, both of the signals RS1 and RS2 become logic low. After time T9, capacitor C1 holds a bias potential substantially equal to the potential VK1+VFB minus $V_1$, the potential of the signal RS2 between times T8 and T9. This potential is insufficient to turn on transistor N2. During operation of the display device, transistor N2 may be turned on by applying a logic-high signal RS2 as described below.

Next, at time T10, the signals AZ1, AZ2 and PC2 become logic high. The signal PC2 turns on transistor N7, erasing any residual charge stored on capacitor C3 as described above. At the same time, signal AZ1 turns on transistor N4 applying the potential VP5 plus VFB to the gate electrode of transistor N1 and to the junction of the source electrode of transistor N6 and the drain electrode of transistor N5. The logic high signal AZ2 applied to transistor N6 turns this transistor on causing it to apply the signal VP5+VFB to the gate electrode of transistor N5, thus turning on transistor N5.

At time T11, the signal AZ1 becomes logic low while the signals AZ2 and PC2 remain logic high. When the signal AZ1 becomes logic low, transistor N4 turns off and the potential applied to the gate electrode of transistor N1 is dissipated through transistor N5, until this potential, as applied to the gate electrode of transistor N5, reaches a level just below the gate to source threshold potential of transistor N5. Because the signals PC2 and AZ2 are logic high at the same time, any charge stored across capacitor C2 is also dissipated during this interval, while capacitor C3 is charged to the VP5 potential.

This operation of the signals AZ1, RS2 and AZ2, establishes the reference potential across Transistor N5 which autozeros the comparator of the column driver shown in FIG. 2. In the exemplary embodiment of the invention, the capacitance CN5 is sufficient to maintain this autozero potential through the entire frame time. Thus, the autozero operation may be performed on a frame basis only and does not need to be performed each line time, as in the conventional line driver shown in FIG. 1.

The line operations of the column driver shown in FIG. 2 begin at time T1, during the row deselect. At time T1, the signal PC2 becomes logic high applying the signal VP5 to capacitor C3, while the signal RAMP is at the reference potential. As described above, this operation erases any stored charge that may exist on capacitor C3 from the prior storage operation. At time T2, the signal RS2 becomes logic high. When RS2 becomes logic-high the potential, V2, applied to the capacitor C1 plus the potential stored on the capacitor C1 causes the potential at the gate electrode of transistor N2 to turn the transistor on thereby applying the potential VK1+VFB to the gate electrode of transistor N1. During the time T2 through T5, the signal RS2 is held logic high, turning on transistor N1 and allowing any charge on the pixel capacitance to dissipate to the signal DATA RAMP which, during this interval, is at the reference potential.

At time T3, the signal PC2 becomes logic low and the signal DTX becomes logic high allowing the charge stored on capacitor C4 to be transferred onto capacitor C3 as described above. At time T4, the signal DTX becomes logic low turning off transistor N9 and breaking the connection between capacitors C3 and C4. Thus, after time T4, the difference between the potential VP5 and the potential across capacitor C3 is proportional to the potential across capacitor C4.

Once the data on capacitor C4 has been transferred to capacitor C3, the signal PC1 becomes logic high applying the potential VP5 to capacitor C4 and thus erasing any data charge that previously had been stored on the capacitor. This step is done prior to storing new input data onto capacitor C4 as described above.

At time T5, the signal RS2 becomes logic low. At this time, any charge stored on the pixel capacitance has been dissipated and the potential VK1+VFB has been stored on the capacitance CN1, allowing transistor N1 to remain turned on after signal RS2 becomes logic low. At time T6, the signals RAMP and DATA RAMP begin increasing in value. As the signal RAMP increases, the combined potential represented by the signal RAMP, the pixel data value stored on capacitor C3, and any potential stored across capacitor C2 is applied to the gate electrode of transistor N5. As this potential increases above its gate to source threshold potential, transistor N5 is turned on, dissipating the charge stored across capacitor CN1 and turning off transistor N1. As described above, the time at which transistor N1 is turned off determines the potential stored on the pixel capacitance.

Figure 4:
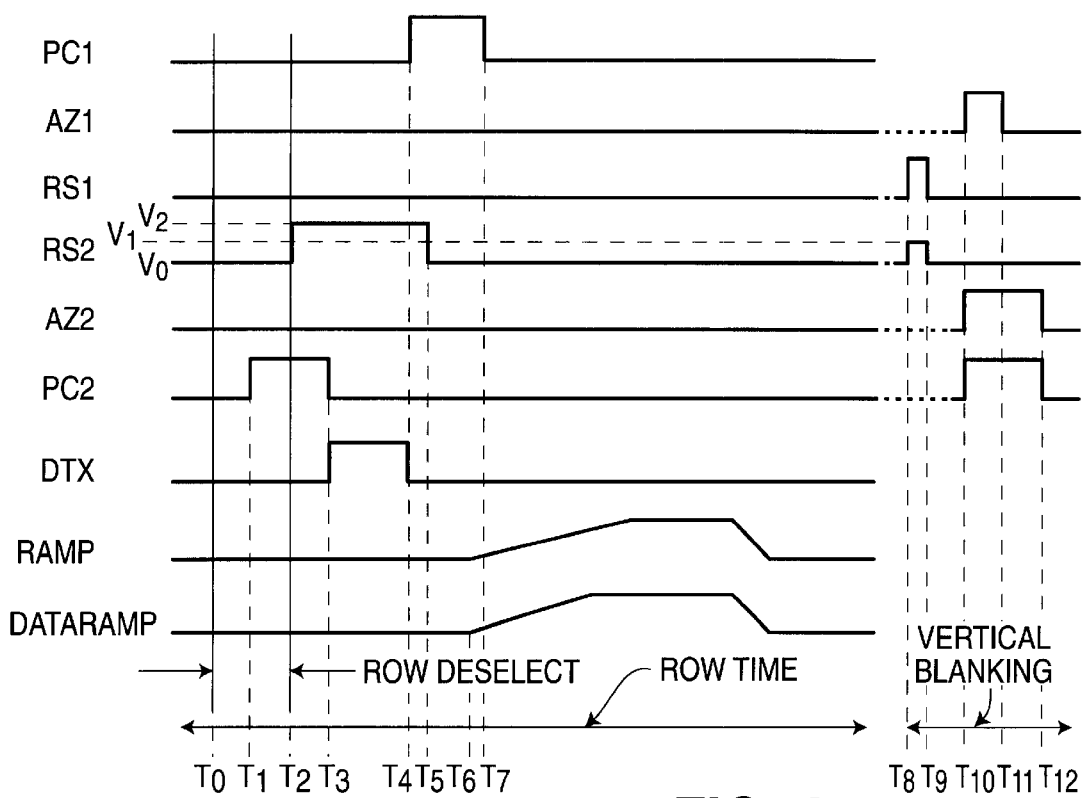
FIG. 4 is a timing diagram which is useful for describing the operation of the column driver circuit shown in FIG. 2.

It is noted that at time T5 in both FIG. 3 and FIG. 4, the initialization operations that are performed in the line time are complete and the comparison operation may begin. Time T5 in FIG. 4, however, is considerably earlier in the line time than T5 in FIG. 3. This allows a longer portion of the line time for the comparison operation to occur. This is especially important when the circuitry shown in FIG. 2 is used with a high-resolution display such as the XGA type display device of the exemplary embodiment of the invention, because this device has a relatively short line time (e.g. 16 microseconds). In addition, it is noted that the duty cycle of transistor N4 has been greatly reduced in the embodiment of the invention shown in FIG. 2 as signal AZ1 is active only during the vertical blanking interval. Furthermore, it is noted that transistor N2 has been compensated for threshold drift by application of the signal VK1+VFB via transistor N3, which is also active only during the vertical blanking interval. Thus the column driver circuitry shown in FIG. 2, in addition to being more suitable for use in a high resolution display device also exhibits less voltage stress and, so, a longer lifetime than the prior art circuitry shown in FIG. 1.

While the invention has been described in terms of an exemplary embodiment, it is contemplated that it may be practiced as outlined above within the scope of the appended claims.

The invention claimed is:

1. A column driver circuit for a display device comprising:
 a source of data signal;
 a source of switching signal having first, second and third states, the second state having a potential greater than the first state and the third state having a potential greater than the second state;
 a first transistor having a principal conduction path between first and second electrodes and a control electrode, the first electrode being coupled to the source of data signal, for applying, responsive to a control signal applied to the control electrode, the data signal to a data line which is coupled to the second electrode and associated with the column of the display device;
 a second transistor having a principal conduction path between first and second electrodes and a control electrode, the first and second electrodes of the second transistor being coupled between a source of reference potential and the control electrode of the first transistor;
 a capacitor, coupled between the control electrode of the second transistor and the source of switching signal; and
 means for selectively applying a control potential to the control electrode of the second transistor while the switching signal is in the second state, the control potential causing the transistor to apply the first reference potential to the control electrode of the first transistor, wherein a bias potential substantially equal to the control potential minus a potential corresponding to the switching signal in the second state is stored on the capacitor; whereby the second transistor is controlled to selectively apply the first reference potential to the control electrode of the first transistor responsive to the switching signal switching from the first state to the third state.

2. A column driver circuit according to claim 1, wherein the display device displays a video signal having video fields separated by respective vertical blanking intervals and the means for selectively applying the bias potential to the control electrode of the second transistor operates only during the vertical blanking interval to store the bias potential on the capacitor and the capacitor maintains a potential which, when combined with the potential corresponding to the switching signal in the third state, is sufficient to cause the second transistor to apply the reference potential to the control electrode of the first transistor.

3. A column driver circuit according to claim 1, wherein the reference potential and the control potential each includes a feedback potential which changes to compensate for threshold drift in the first and second transistors, respectively.

4. A column driver circuit for a display device which displays a video signal having video fields separated by respective vertical blanking intervals, the column driver circuit comprising:
 a terminal for receiving an input pixel value;
 a terminal for receiving a first ramp signal;
 a first transistor responsive to a control signal for selectively applying the first ramp signal to a data line which is associated with the column of the display device;
 a terminal for receiving a second ramp signal; and
 a comparator which compares the input pixel value to the second ramp signal to generate the control signal causing the first transistor to stop applying the first ramp signal to the data line when the second ramp signal exceeds the input pixel value, the comparator including:

a second transistor having first and second electrodes which define a principal conduction path and a control electrode, the second transistor having a turn-on threshold potential between the first electrode and the control electrode which must be exceeded to render the principal conduction path conductive;

a capacitance coupled between the first electrode and the control electrode; and an autozero circuit which stores, in the capacitance, a potential substantially equal to the turn-on threshold potential, wherein the autozero circuit operates during the vertical blanking interval and the capacitance is sufficient to store the threshold potential for one field interval.

5. A method of driving a column of a display device with a data signal comprising the steps of:

providing a switching signal having first, second and third states, the second state having a potential greater than the first state and the third state having a potential greater than the second state;

applying the data signal to the column of the display device via a first transistor coupled between the data signal and the column of the display device responsive to a control signal applied to a control electrode;

controlling the first transistor via a second transistor, coupled between a source of reference potential and the control electrode of the first transistor;

storing on a storage device, coupled to the control electrode of the second transistor, a bias potential, which, when combined with the switching signal in the second state causes the second transistor to control the first transistor to apply the data signal to the column of the display device; and selectively switching the switching signal between the first and third states to control the application of the data signal to the column of the display device.

6. A method according to claim 5 wherein the display device displays a video signal having video fields separated by respective vertical blanking intervals and the step of storing the bias potential on the storage device occurs during the vertical blanking intervals.

7. Apparatus for driving a column of a display device with a data signal comprising:

means for providing a logic signal having first, second and third states, the second state having a potential greater than the first state and the third state having a potential greater than the second state;

first transistor means for applying the data signal to the column of the display device, the first transistor means having a control electrode and a principal conduction path coupled between the data signal and the column of the display device;

second transistor means for controlling the first transistor, the second transistor having a principal conduction path coupled between a source of reference potential and the control electrode of the first transistor;

means for storing a bias potential, which, when combined with the switching signal in the second state causes the second transistor means to control the first transistor to apply the data signal to the column of the display device; and means for selectively switching the logic signal between the first and third states to control the application of the data signal to the column of the display device.

8. Apparatus according to claim 7 wherein the display device displays a video signal having video fields separated by respective vertical blanking intervals and the means for storing the bias potential on the storage device stores the bias potential during the vertical blanking intervals.

9. Apparatus for driving a column of a display device with a data signal wherein the display device displays a video signal having video fields separated by respective vertical blanking intervals, the apparatus comprising:

means for providing an input pixel value;

means for selectively applying a first ramp signal to the column of the display device responsive to a control signal;

comparator means for comparing the input pixel value to a second ramp signal to generate the control signal to cause the first ramp signal to cease to be applied to the column of the display device when the second ramp signal exceeds the input pixel value, the comparator means including:

means for autozeroing the comparator by applying an autozero signal during the vertical blanking interval;

means for storing the autozero signal in the comparator for one field interval.

* * * * *